United States Patent [19]

Jones

[11] Patent Number: 4,491,258
[45] Date of Patent: Jan. 1, 1985

[54] CONVERTIBLE BACKPACK

[76] Inventor: Richard R. Jones, Box 919, Ft. Collins, Colo. 80522

[21] Appl. No.: 374,520

[22] Filed: May 3, 1982

[51] Int. Cl.³ .............................. B62J 7/04; B62J 7/06; A45F 3/08
[52] U.S. Cl. .................................. 224/153; 224/32 A; 224/210
[58] Field of Search .................. 224/151, 153, 32 A, 224/32 R, 209, 210, 211, 215, 216; 190/110

[56] References Cited

U.S. PATENT DOCUMENTS

| Re. 25,826 | 8/1965 | Ward | 190/110 X |
|---|---|---|---|
| 2,836,334 | 5/1958 | Davis | 224/153 |
| 3,061,057 | 10/1962 | Miller | 190/110 |
| 3,443,671 | 5/1969 | Dyke | 190/110 X |
| 3,786,972 | 1/1974 | Alley . | |
| 3,830,348 | 8/1974 | Ohyama | 190/110 X |
| 3,902,640 | 9/1975 | Geiben | 224/153 X |
| 3,937,374 | 2/1976 | Hine, Jr. . | |
| 3,938,716 | 2/1976 | Jackson et al. . | |
| 3,970,229 | 7/1976 | Norinsky | 224/35 X |
| 4,003,508 | 1/1977 | Hoops . | |
| 4,059,207 | 11/1977 | Jackson et al. . | |
| 4,133,464 | 1/1979 | Kelty | 403/190 X |
| 4,236,657 | 12/1980 | Brunton | 224/153 |
| 4,248,367 | 2/1981 | Buel . | |
| 4,258,869 | 3/1981 | Hilgendorff . | |
| 4,318,502 | 3/1982 | Lowe et al. | 224/153 |
| 4,424,841 | 1/1984 | Smith | 190/110 X |

FOREIGN PATENT DOCUMENTS

| 300278 | 12/1915 | Fed. Rep. of Germany . | |
|---|---|---|---|
| 380495 | 12/1939 | Italy | 224/210 |
| 80550 | 8/1952 | Norway . | |
| 41690 | 12/1907 | Switzerland | 224/214 |
| 199348 | 8/1938 | Switzerland | 224/210 |
| 230388 | 12/1943 | Switzerland . | |
| 877460 | 9/1961 | United Kingdom . | |

OTHER PUBLICATIONS

Trek Pak Advertisement.

Primary Examiner—Stephen Marcus
Assistant Examiner—Robert Petrik
Attorney, Agent, or Firm—Price, Heneveld, Huizenga & Cooper

[57] ABSTRACT

An assembly which provides a backpack convertible to bicycle panniers. The device provides a maximum amount of storage capacity and comfort to the wearer and a minimum amount of weight. A main storage element having three storage compartments carries a removable shoulder assembly. In the preferred form, two flat metal strips insert into sleeves on the back of the main storage element to provide a removable frame when the assembly is in the backpack mode. Also, preferably two side storage elements each having three storage compartments attach to either side of the main storage element. When the shoulder straps and frame are removed from the assembly, and the side elements are removed from the main storage element, the two side storage elements can be interconnected and mounted on the front rack of a bicycle to provide a front pannier element. The main storage element can be mounted on the back rack of a bicycle to provide a back pannier element. Further, preferably one side storage element can be removed from the main storage element and with a strap attached be worn about the waist of an individual.

11 Claims, 10 Drawing Figures

CONVERTIBLE BACKPACK

BACKGROUND OF THE INVENTION

This invention relates to a device for transporting personal articles, and in particular to a device which can be used by an individual as a backpack, but which also can be used as panniers mounted on a bicycle, motorcycle, horse, or other carrying means.

Both backpacking and bicycling have been receiving increased interest in recent years as forms of recreation and exercise. Backpacks have long been old in the art, and with the increased interest in the area of backpacking, the variety of backpack designs are increasing. Although there is a wide variety of designs for backpacks, almost uniformally it is desired that a backpack design provide a maximum amount of storage capacity and comfort coupled with a minimum amount of weight.

Similar to the backpacking art, bicycle panniers have long been known in the art and various designs have been developed. Generally, bicycle panniers consist of two saddlebags which are supported on a rack located over a bicycle's rear wheel, and often have a storage compartment connected to the top of the saddlebags. As in the backpack art, it is desirable that panniers provide a maximum amount of storage capacity while maintaining a minimum amount of weight.

Due to the expense associated with both backpacks and panniers, it would be desirable to provide a device which can be used both as a backpack and also be mounted upon a bicycle so that individuals who are enthusiasts of both sports are not required to purchase two separate items. Additionally, with a device that can be converted from a set of panniers into a backpack, a person that desires to visit a location inaccessible to a bicycle is free to do so without being required to carry a backpack along on his bicycle.

To this end, certain bicycle pannier devices can be converted into a backpack. However, as with normal backpacks and panniers, it is still desirable that such convertible panniers or backpacks retain a maximum amount of storage capacity in both the backpack and pannier mode while providing a minimum amount of weight, and also provide a maximum amount of comfort to the wearer of the backpack. For this reason, convertible backpacks having a heavy metal frame are not as desirable as convertible backpacks having a lightweight construction. In order to provide a convertible design, other convertible backpacks must sacrifice some storage capacity in either the backpack or pannier mode, and some devices which are designed primarily for use in the pannier mode do not provide a maximum amount of comfort or adaptability to the build of the backpack wearer.

SUMMARY OF THE INVENTION

The present invention relates to a device for carrying objects that can be worn as a backpack or mounted on a bicycle.

The present invention provides a device for carrying objects which provides a maximum amount of storage capacity while both in the backpack and the bicycle pannier mode. While in the backpack mode, a main storage element has attached to either side a removable side storage element. The main storage element is comprised of three compartments, which when in the pannier mode provide a set of saddlebags and a duffle bag located on top of the webbing connecting the two saddlebags. When removed from a bicycle the main storage element can be opened out so that the three compartments lay in the same plane, enabling the two side storage elements to be attached. Shoulder straps can be connected to the main storage element and a lightweight internal frame is inserted into the main element so that the device assumes the shape and storage capacity of a large backpack.

The side storage elements each also comprise three storage compartments, so that when the device is in the bicycle pannier mode each side element can be converted into a smaller set of panniers comprised of two saddlebags and a duffle bag supported on the webbing connecting the saddlebags. In this configuration the two side storage elements can be connected to form a front wheel pannier assembly, which can be mounted on a rack over the front wheel of a bicycle.

A strap or belt can be attached to one of the side storage elements to enable the side storage compartment to be used individually as a hip or belt bag.

In a more specific embodiment of the invention, two vertically oriented strips of webbing are sewn to the back of the main storage element to provide two sleeves, each having a reinforced opening on one side. Two flat aluminum strips are inserted through the reinforced opening and positioned within the sleeves to provide a frame for the device while in the backpack mode.

Each side compartment includes a zipper which mates with a zipper on the side of the main storage element to allow for easy attachment and removal of the side elements. Further, the zippers on the side elements also mate together to allow interconnection of the side elements for use as set of panniers mounted above a bicycle's front wheel. A flat aluminum strip is inserted behind a webbing sleeve at the base of both side element's saddlebags when the two side elements are interconnected, providing a rigid base for connecting the front panniers assembly to the bicycle.

The shoulder straps are connected to the main storage element by adjustable fasteners, with the back base of the shoulder straps being connected to the main storage element by a series of two sliding strap buckles and webbing to allow for easy removal and attachment of the shoulder straps to the device. A number of snaps provide further means for attaching the side elements to the main storage element, and to each other.

DETAILED DESCRIPTION OF THE PREFERRED EMBODIMENT

Figure 1:
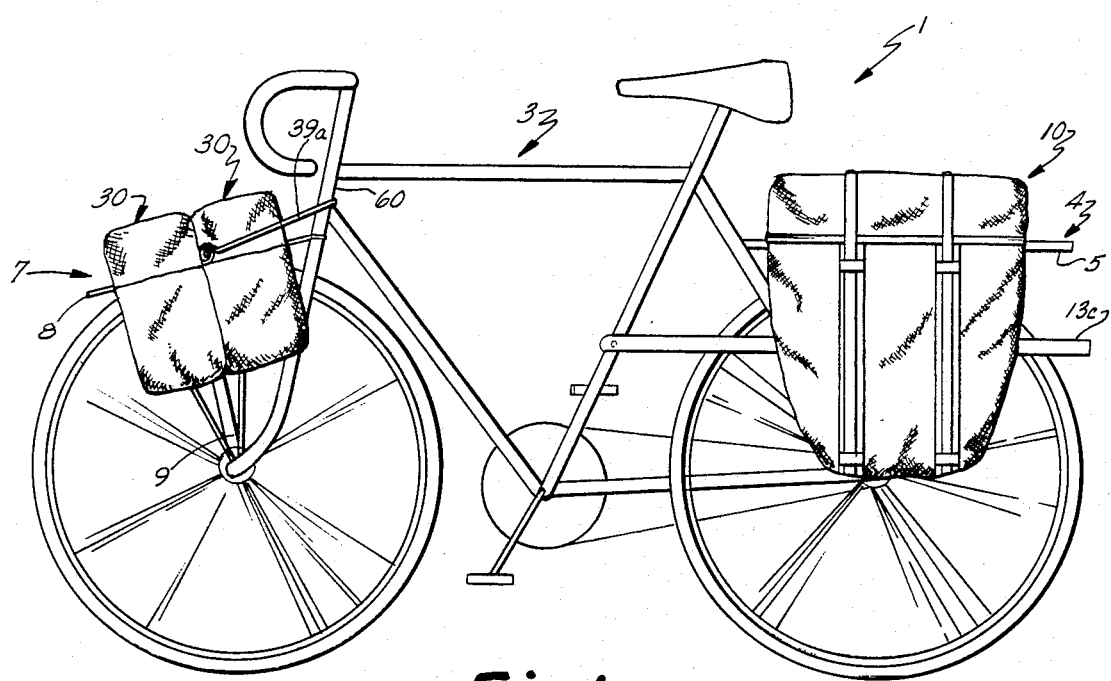
FIG. 1 is a side elevational view of a bicycle having mounted thereon a set of panniers embodying the present invention.
Figure 2:
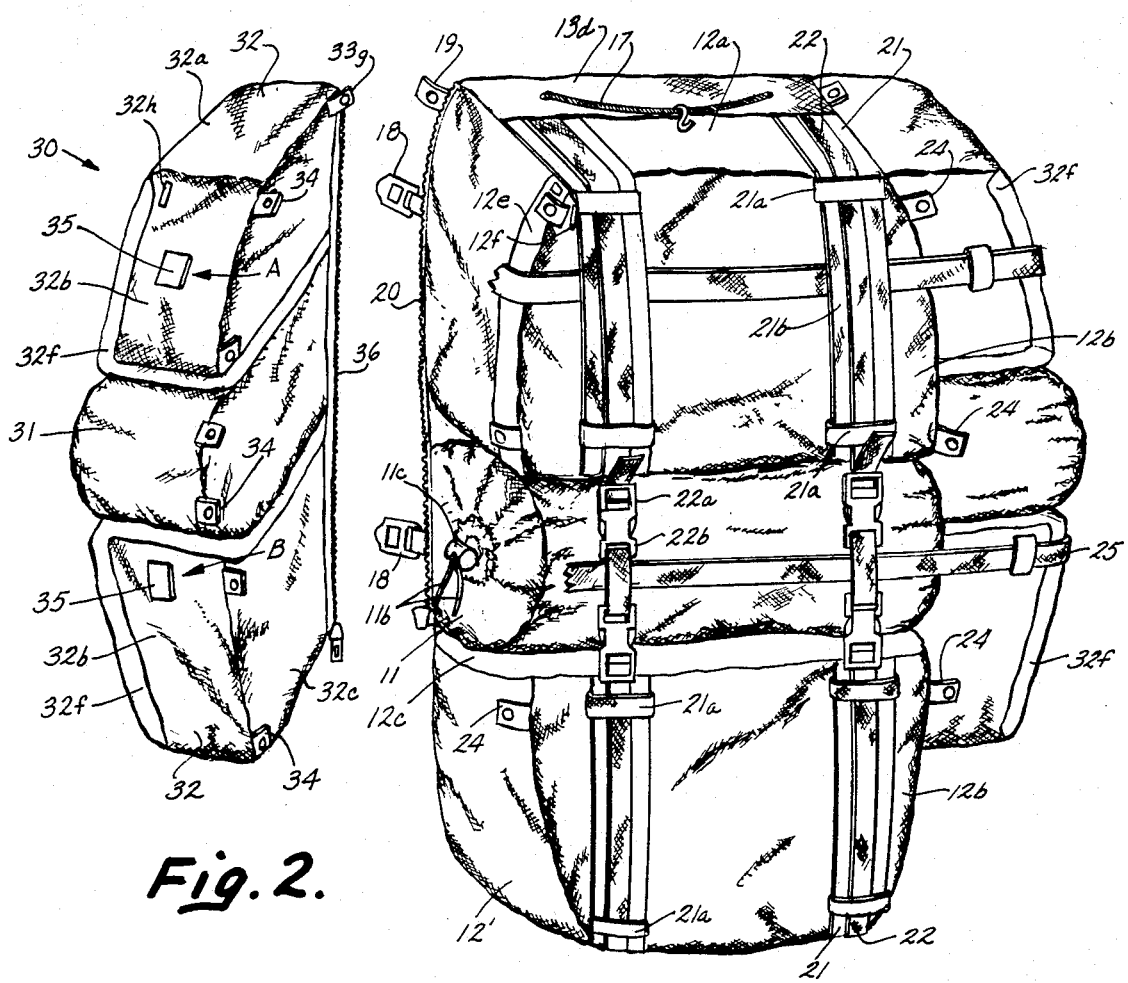
FIG. 2 is a front perspective view of a backpack embodying the present invention.
Figure 3:
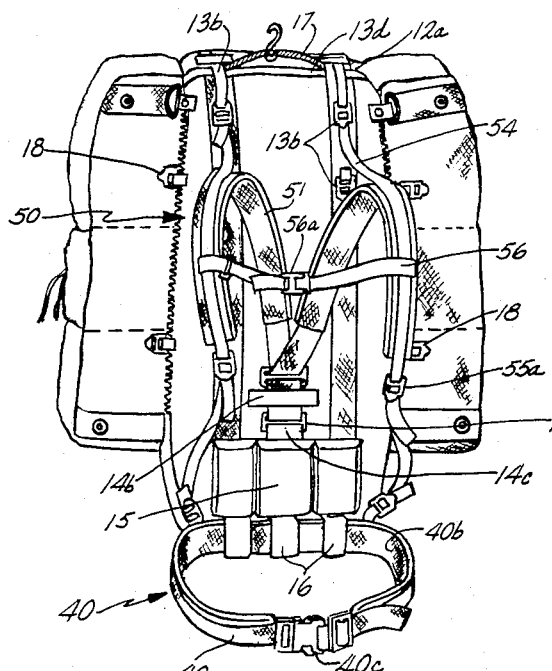
FIG. 3 is a back elevational view of a backpack embodying the present invention.
Figure 4:
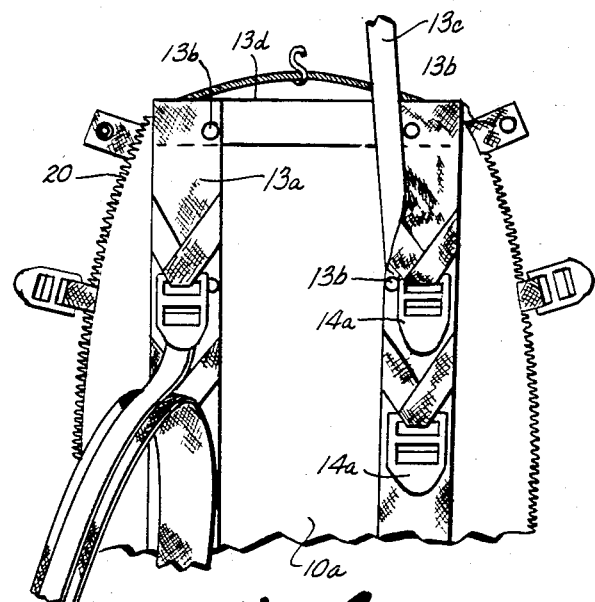
FIG. 4 is a back fragmentary, elevational view of a backpack with frame embodying the present invention.

The convertible backpack/panniers of the present invention has two general modes, that of a bicycle panniers assembly 1 shown in FIG. 1, and that of a backpack 2 shown in FIG. 2. The device includes a main storage element 10 made of nylon fabric, having two end compartments or saddlebags 12 and a main duffle compartment 11 attached to the section of nylon fabric 11a connecting saddlebags 12. Two side storage elements 30 also made of nylon fabric have a similar configuration as main storage element 10, each having two side element end compartments or saddlebags 32 and a side duffle compartment 31 attached to the nylon fabric 31a connecting the side saddlebags 32.

Figure 5:
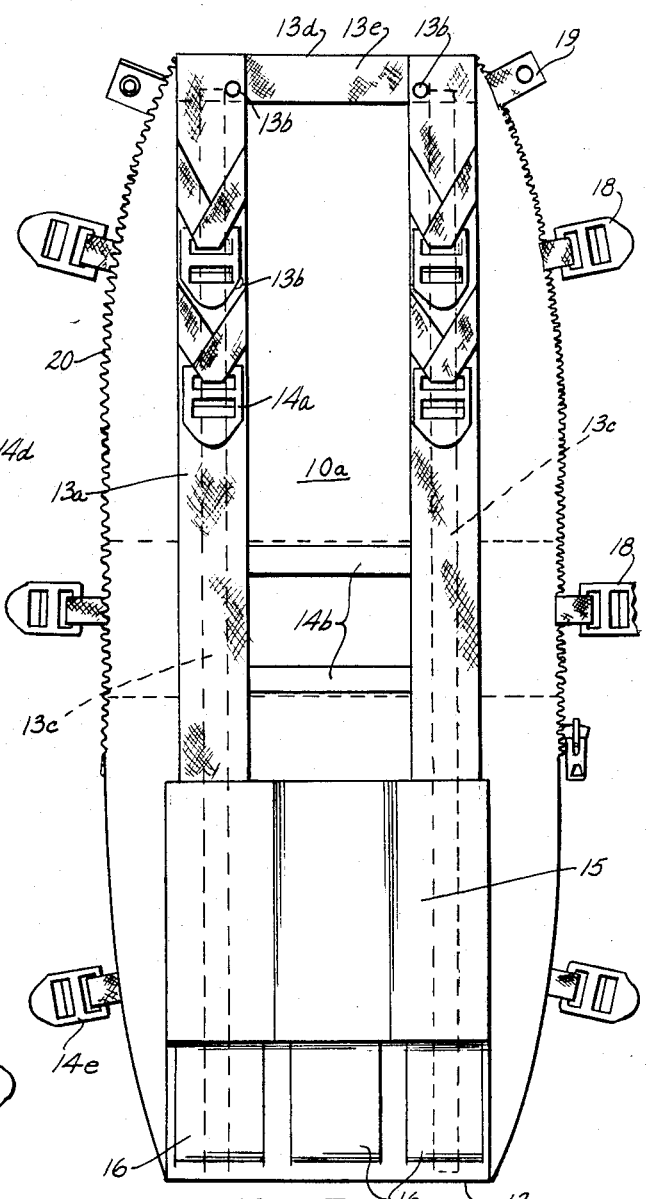
FIG. 5 is a back elevational view of a main storage element of the present invention prior to conversion into the pannier mode.
Figure 6:
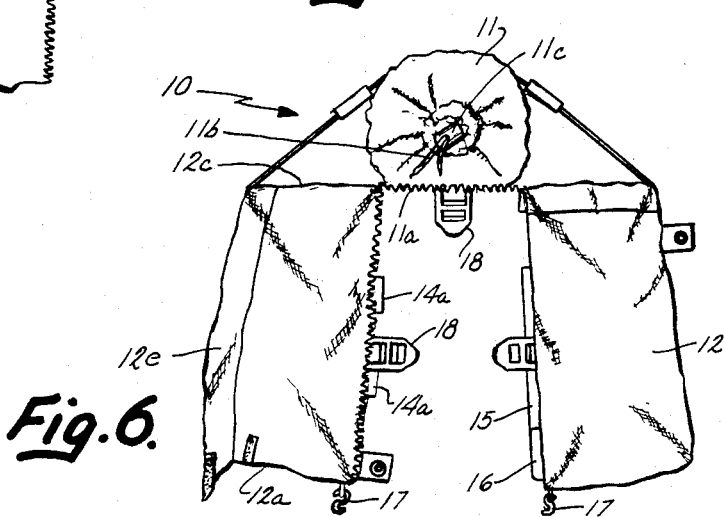
FIG. 6 is an end elevational view of a rear wheel set of panniers embodying the present invention.
Figure 7:
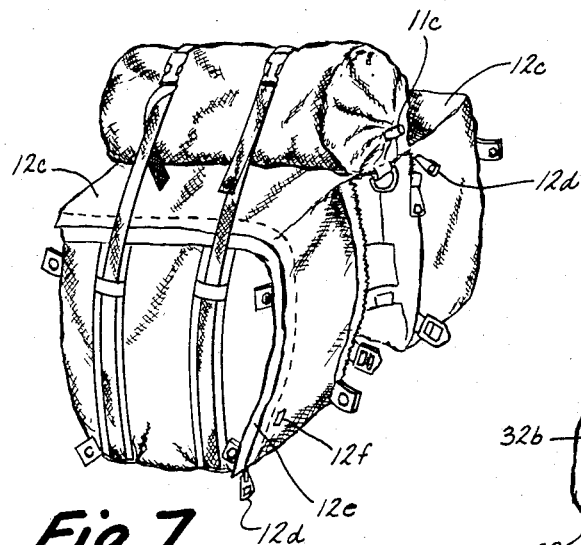
FIG. 7 is a side elevational view of a rear wheel set of panniers embodying the present invention.
Figure 8:
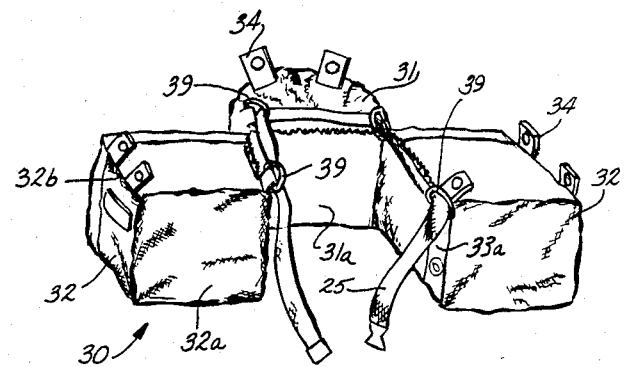
FIG. 8 is a back perspective view of a belt bag embodying the present invention.

While in bicycle mode 1 main storage element 10 has a generally inverted U-shaped configuration, shown in FIG. 6, which is supported on the back rack 4 of a bicycle 3 to form a set of rear panniers. The two side storage elements 30 are interconnected and also have an inverted U-shape. The connected side storage elements 30 are supported on a front rack 7 of a bicycle 3 to form a front set of panniers. While in the backpack mode 2, main storage element 10 is opened out so that all three compartments lie generally in a single plane, shown in FIG. 5. The two slightly tapered side storage elements 30 are attached to either side of the main storage element 10 to provide a maximum amount of storage capacity. An internal frame system 13 is inserted into main storage element 10 and a shoulder strap assembly 50 and hip strap 40 is connected to the back of main storage element 10 to allow the device to be carried like a normal backpack.

On the back 10a of main storage element 10 are sewn two strips of webbing which form sleeves 13a that are vertical when the device is in the backpack mode 2. A section on one side of each of these strips 13a is not sewn to the main storage element back 10a, thus leaving an opening of about 4½ inches. Two rivets 13b are located on either end of the opening of each sleeve 13a in order to reinforce the opening. A flat strip of aluminum 13c is slid between the two rivets 13b and into each of the sleeves 13a. A strip of webbing 13d is sewn to the base 12a of either end compartment or saddlebag 12. The strip of webbing 13d and saddlebag base 12a enclose a flat strip of aluminum as long as the width of the bottom of each saddlebag 12, the aluminum strip being oriented horizontally when the device is in the backpack mode 2 to maintain the separation of the vertical aluminum strips 13c of the frame system 13. At the top of the main storage element is connected a strip of webbing which forms a lifting strap 13e.

On the back 10a of the main storage element 10 is located the shoulder strap connection apparatus 14. Attached to the top of each sleeve 13a are two adjustable fasteners 14a. Sewn to the back 10a of the lower end compartment 12' is a strip of webbing 14c which carries a sliding strap buckle or tri-glide 14d. Projecting from each of the sides of the lower end compartment 12' is a base adjustable fastener 14e. Sewn to the back 10a of the main duffle 11 are two horizontally oriented loops of webbing which form middle strap retainers 14b.

Connected to the back of the lower end compartment 12' is a cushion or pad 15, below which are located three loops of webbing 16 which provide for the attachment of a hip strap 40. An elastic bungy or shock cord 17 is connected to each of the bases 12a of the end compartments 12 by connection to the short webbing 13d which houses the aluminum separator strips. The separator strips keep the ends of the bungy cord 17 separated when the bungy cord is tensed. A hook 17a is carried on either of the bungy cords.

Two adjustable fasteners 18 project from side of back 10a of the main storage element 10 and a snap 19 is located near the base 12a of the top end compartment 12, extending outward from either side of the end compartment. A zipper 20 is located on either side of back 10a and is oriented vertically when the device is in the backpack mode 2. Zippers 20 extend the length of the top end compartment 12 and main duffle 11. One zipper 20 carries a closure element 20a, while the other zipper 2 does not.

As shown in FIG. 2, each end compartment 12 has two sections of support webbing 21 which are sewn to the end compartments base 12a and extend vertically across the front 12b of the end compartments 12. Each section of support webbing 21 has two loops of webbing 21a attached thereto. Vertical tension straps 22 are connected to the base 12a of each end compartment near the back 10a, and pass behind loops 21a on support webbing 21. Vertical tension straps 22 carry an adjustable snap clip 22a which connects to a mating snap clip 22b affixed to main duffle 11. Two snaps 24 extend from either side of the top end compartment 12, and a snap 24 extends from either side of lower end compartment 12.

Flap 12c, shown in FIG. 6, covers an opening in each of the end compartments 12 adjacent main duffle 11, and can extend along one side of upper end compartment 12. Zippers 12d hold flaps 12c shut and wind flaps 12e prevent rain from being driven in through zippers 12d. Hook and loop connectors 12f allow the wind flaps 12e to be oriented in different directions depending upon the mode the device is being used in. Lateral compression straps 25 can be hooked through side adjustable fasteners 18 and fed under loop areas 21b of support webbing 21. Main duffle 11 has a draw string closure 11b with a spring lock 11c for holding the draw string in a closed position.

The side storage elements 30 have a similar configuration to main storage element 10. Side duffle 31 has a roughly cylindrical shape and is sewn to the connecting webbing 31a that connects the two side storage elements and end compartments 32. End compartments 32 have a base 32a, a front 32b, sides 32c and a closure flap 32d.

Figure 10:
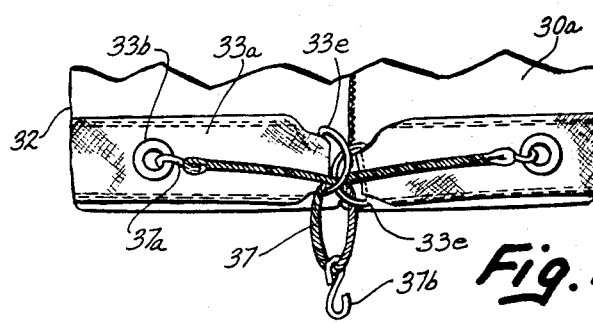
FIG. 10 is a back, elevational, fragmentary view of the reinforcing strip area of two interconnected panniers embodying the present invention.
Figure 9:
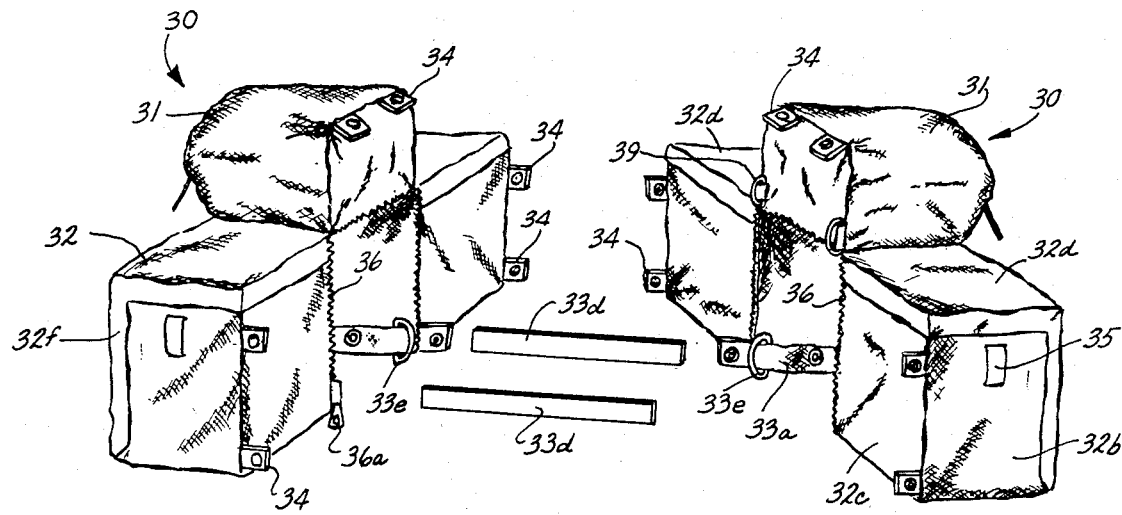
FIG. 9 is a side perspective view of two side storage elements prior to connection for the pannier mode.

On the back 30a of side storage elements 30 are two strips of webbing 33a sewn horizontally across the back 30a and adjacent to each of the bases 32a of the end compartments. As shown in FIG. 10, each webbing reinforcing sleeve 33a carries a grommet 33b which passes through webbing 33a near one side 32c of end compartment 32. At the other end of reinforcing sleeve 33a is a metal D-ring 33e which is used to connect the front panniers to the bicycle. Each reinforcing sleeve 33a has an opening at the end which carries D-ring 33e which allows a flat aluminum reinforcing strip 33d to be inserted between webbing 33a and back 30a of the end compartment. The two reinforcing strips 33d are slightly less than twice as long as reinforcing sleeves 33a, so that strips 33d can be accommodated within two reinforcing sleeves 33a simultaneously. Extending from the side of the top end compartment 32 is a snap 33g near the base 32a of end compartment 32. A zipper 36 extends along one side of the back 30a of each side element 30, with the zipper 36 of one side element 30 carrying a closure element 36a and the zipper 36 of the other side element 30 not carrying a closure element. Zippers 36 mate with zippers 20 on main storage element 10, with the side element 30 which does not have a closure element 36a mating with the zipper 20 which has a closure element 20a.

Sewn onto the front 32b of each end compartment 32 of the side elements 30 are lateral strap loops 35 which are positioned for receiving lateral compression straps 25. Extending from one side of each of the three compartments on each side storage element 30 are two snaps 34, which mate with snaps 34 on the other side element 30, one side element carrying the female portion and the other side element 30 carrying the male portion. Each closure flap 32d on end compartments 32 carry a zipper which can continue along one side of each end compartment 32. Wind flaps 32f prevent rain from being driven through zipper 32e, and flaps 32f on the upper end compartment 32 can be oriented in two different directions. Hook and loop connections 32h hold wind flaps 32f in the position so desired. Bungy cord 37 is used to connect the front pannier assembly to a bicycle 3, bungy cord 37 having a hook 37a on either end and carrying a third hook 37b freely along its length.

Two D-rings 39 are located on the zipper carrying side of one side element 30. D-rings 39 extend from either side of duffel 31 adjacent end compartments 32. A bungy cord 39a, hooks into D-rings 39 and passes around the headset 60 of the bicycle as shown in FIG. 1.

Hip strap 40 includes a webbed strap 40a, to which is sewn a pad 40b and which carries on either end one mating half of a snap clip 40c. Shoulder strap assembly 50 includes two shoulder pads 51 which are joined by a joining webb 52, on which is slidably carried a bottom sliding buckle 53. The unjoined ends of shoulder pads 51 have sewn thereto back adjustment straps 54 which allow for connection with top adjustable fasteners 14a on the main storage element 10. Extending from each of the unjoined ends of pads 51 is an adjustable fastener 55a which adjustably carries bottom connecting strap 55. Cross chest strap 56 connects the unjoined ends of shoulder pads 51, cross chest strap 56 having a snap clip 56a therein. Cross chest strap 56 is releasably secured to shoulder pads 51, so the position of cross chest strap 56 can be adjusted.

OPERATION

BACKBACK MODE

With the above detailed description and enclosed drawings the operation of the present invention should be evident.

To place the device in the backpack mode 2, side storage elements 30 are attached to main storage element 10 by mating zippers 36 with zippers 20. Top snaps 19 are snaped to top snaps 33g on side storage elements 30. Side snaps 24 on the front of main storage element 10 snap to side snaps 34 on side storage element 30.

Frame strips 13c are slid through the openings between rivets 13b and slid down into sleeves 13a. Frame strips 13c and the aluminum separator strips underneath webbing 13d comprise a pack frame for the backpack and keep main storage element 10 opened out into the backpack mode 2. Although aluminum strips 13c are substantially rigid, since they have a flat shape the backpack can be conformed somewhat to the individual wearer.

The webbing 14c and bottom sliding strap buckle 14d are passed behind at least one middle strap retainer 14b, and webbing 14c is then woven through bottom sliding strap buckle 53 carried on pads 51. Webbing 14c is of sufficient length that after being woven through strap buckle 53 it can again be woven through bottom strap buckle 14d. This secures one end of shoulder strap assembly to main storage element 10. Back adjustment straps 54 are then threaded through the desired top adjustable fasteners 14a, and bottom connecting straps 55 are threaded through base adjustable fasteners 14e. To adjust shoulder strap assembly 50 to the proper tension, the overall length of shoulder pads 51 can be adjusted at base adjustable fasteners 14e, or at 14c and the upper portion of the backpack 2 can be brought closer to or further away from the wearer's back by adjusting back adjustment straps 54. Bringing the pack closer to the back takes weight off the shoulder straps, leaving it mostly on the hips. Hip strap 40 is then threaded through hip loops 16.

After the backpack 2 has been loaded, lateral compression straps 25 are threaded through side adjustable fasteners 18, lateral strap loops 35 and support webbing loops 21b and then tautened to maintain the load in a compact shape. Vertical tension straps 22 are also tautened.

BICYCLE PANNIER MODE

To place the device into the bicycle pannier mode 1, frame strips 13c are slid out of sleeves 13a. All of the adjustable fasteners connecting shoulder strap assembly 50 are released and shoulder strap assembly 50 removed. Vertical tension straps 22 are loosened, lateral compression straps 25 are removed and snaps 33e and 34 are unsnapped. Zippers 36 are unzipped and side storage elements 30 removed from main storage element 10. Main storage element 10 is folded into a generally inverted U-shape, shown in FIG. 6. Main storage element 10 is placed over a back bicycle rack 4, with the area 11a that connects end compartments 12 resting on the horizontal shelf 5 of the rack 4. Hooks 17a on bungy cords 17 are hooked under the horizontal tire support frame element of the bicycle or the bicycle rack to connect storage element 10 to the bike. If additional support is desired a strap can be threaded through side adjustable fasteners 18 located on the area 11a underneath main duffle 11, the strap then being tied around horizontal shelf 5 of back rack 4. After the compartments have been loaded vertical tension straps 22 can be tautened and additional objects can be carried between vertical tension straps 22 the tops of closure flaps 12c of the main end compartments 12. This tautening pulls the bag 12 up and out, putting extra tension on bungy 17 making the load more stable.

The frame strips 13c can be secured to the bicycle when not in use. A ring clamp is placed on the bicycle frame post and the tightening screw of the clamp pass through a hole in the strips to secure one end thereto. A C-shaped clip is connected to the bicycle rack or the rear wheel support portion of the bicycle frame. The frame strips 13c snap into these clips and are thereby secured to the bicycle.

To assemble the front pannier assembly, a reinforcing strip 33d is slid behind the two reinforcing sleeves 33a of one of the side storage elements 30. The reinforcing sleeves 33a of the other side storage element 30 then receive the protruding portion of reinforcing strips 33d. Zippers 36 are mated and zipped together and snaps 34 and 33g snapped together. The front pannier assembly is then bent into a generally inverted U-shaped configuration and placed on a bicycle front rack 7, so that the horizontal shelf 8 supports the side elements duffle compartments 31. As shown in FIG. 10, a bungy cord 37 is connected to each set of reinforcing sleeves 33a, with one end hook 37a being hooked through a grommet 33b, the bungy cord being threaded through the opposite side element's D-ring and the bungy cord then passed through the first side element's D-ring. The hook 37a on the bungy cord's free end is then hooked into the grommet 33b on the other side storage element, with the hook 37b carried along the length of bungy cord 37 hanging from the length of cord positioned between the two D-rings. This hook 37b is then connected to the front rack's vertical support 9 to connect the front pannier assembly to the bicycle. Reinforcing strips 33d provide a rigid base to connect the front panniers to the bicycle and keep the panniers from contacting the front wheel of the bicycle. Reinforcing connector 33d also keeps the front pannier assembly opened out into a load carrying shape. Bungy cord 39a is hooked to D-rings 39 and passed around headset to keep the panniers from sliding forward.

One side storage element can be disconnected from the main storage element and used as a hip or belt bag. A lateral compression strap 25 is threaded through D-rings 39 and 33e to provide a belt, and strap 25 can carry a buckle if desired. In the alternative, hip strap 40 can be used as the belt. Short lengths of material are sewn to the unpadded side of the belt, these sections of material carrying snaps so the material can be looped through D-rings 39 and 33e and snapped on to hip strap 40.

Although the above description refers to use of the invention in a bicycle mode, it is to be understood that the invention can be used with a motorcycle, horse or other carrying means.

It is understood that the above is the preferred embodiment of the invention and that various changes and alternations can be made without departing from the spirit and broader aspects thereof as defined by the claims set forth below and by the range of equivalency allowed by law.

The embodiments of the invention in which an exclusive property or privilege is claimed are defined as follows:

1. A convertible backpack assembly comprising:
a main storage element having a plurality of compartments flexibly connected together for arrangement into at least a first position and a second position, said assembly in said first position having a top storage compartment and two side storage compartments depending therefrom, said assembly in said second position having a top storage compartment, a middle storage compartment and a bottom storage compartment, with all three storage compartments generally linearly aligned with the backs thereof generally on one plane;
a plurality of shoulder straps related to said main storage element;
a plurality of frame support means attached to each of said backs of all three storage compartments;
a substantially rigid removable frame means for providing support to said assembly, said frame means including a plurality of vertical frame strips removably supported by said frame support means and extending between said top storage compartment, said middle storage compartment and said bottom storage compartment when said main storage element is in said second position, such that when said frame means is removed from said assembly said main storage element can be moved to said first position and attached to a carrying means, and when said frame means is secured to said assembly said main storage element can be securely carried on a person's back and is maintained in said second position by said frame means.

2. The apparatus as described in claim 1 wherein said substantially rigid frame means is not exposed when supporting said assembly.

3. The apparatus as described in claim 1 wherein said substantially rigid frame means is not exposed when supporting said assembly.

4. An assembly as described in claims 1 or 3 in which said frame support means includes a plurality of sleeves attached to said three storage compartments, said frame means including two flat, metal vertical frame strips which each extend substantially the entire length of said main storage element and are received and enveloped by said sleeves.

5. An assembly as described in claim 2 having a plurality of sleeves attached to said three storage compartments, said frame means including a plurality of vertical frame strips which are received and enveloped by said sleeves.

6. An assembly as described in claim 5 wherein each of said sleeves define an opening on one side of said sleeve, said sleeve having reinforcement adjacent said opening, such that said vertical frame strips can be received by said reinforced side openings and insertion into said sleeves.

7. An assembly as described in claim 2 wherein said frame means includes two vertical, substantially rigid strips and a pair of horizontal substantially rigid spacers, said spacers maintaining a fixed separation of said vertical strips while said assembly is in use.

8. An assembly as described in claim 3 wherein said frame means includes two vertical, substantially rigid strips and a pair of horizontal substantially rigid spacers, said spacers maintaining a fixed separation of said vertical strips while said assembly is in use.

9. An assembly as described in claim 6 wherein said frame means includes two vertical, substantially rigid strips and a pair of horizontal substantially rigid spacers, said spacers maintaining a fixed separation of said vertical strips while said assembly is in use.

10. A convertible backpack assembly comprising:
a main storage element;
a plurality of shoulder straps related to said main storage element;
connecting means for connecting said main storage element to a carrying means;
a substantially rigid removable frame means for providing support to said assembly, such that when said frame means is removed from said assembly said main storage element can be attached to a carrying means, and when said frame means is secured to said assembly said storage element can be carried on a person's back;

said frame means including a plurality of sleeves attached to said main storage element, said frame means also including a plurality of vertical frame strips which are received and enveloped by said sleeves, each of said sleeves define an opening on one side of said sleeve, said sleeve having reinforcement adjacent said opening, such that said vertical frame strips can be received by said reinforced side openings and insertion into said sleeve.

11. An assembly as described in claim 10 wherein said frame means includes two vertical, substantially rigid strips and a pair of horizontal substantially rigid spacers, said spacers maintaining a fixed separation of said vertical strips while said assembly is in use.

* * * * *